(12) United States Patent  
Nam et al.

(10) Patent No.: US 10,834,243 B2
(45) Date of Patent: Nov. 10, 2020

(54) MOBILE TERMINAL

(71) Applicant: LG ELECTRONICS INC., Seoul (KR)

(72) Inventors: Jinsu Nam, Seoul (KR); Dohyung Kwon, Seoul (KR); Donghyun Kim, Seoul (KR); Sangwook Park, Seoul (KR); Sanghwon Jung, Seoul (KR); Sukho Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 16/050,241

(22) Filed: Jul. 31, 2018

(65) Prior Publication Data

US 2019/0320049 A1 Oct. 17, 2019

(30) Foreign Application Priority Data

Apr. 16, 2018 (KR) .................. 10-2018-0044051

(51) Int. Cl.
H04M 1/02 (2006.01)
G06F 1/16 (2006.01)

(52) U.S. Cl.
CPC ........ *H04M 1/0266* (2013.01); *G06F 1/1656* (2013.01)

(58) Field of Classification Search
CPC .... H04M 1/0266; G06F 3/147; G06F 1/1656; G06F 1/1605; G01N 2203/006; G02N 2203/0066
See application file for complete search history.

(56) References Cited

U.S. PATENT DOCUMENTS

| 6,516,104 | B1* | 2/2003 | Furuyama | G02B 6/4214 385/14 |
| 2007/0073271 | A1* | 3/2007 | Brucker | A61M 25/0041 604/537 |
| 2010/0090584 | A1* | 4/2010 | Kawai | G09G 3/22 313/498 |
| 2013/0163801 | A1* | 6/2013 | Ha | H04M 1/185 381/334 |
| 2014/0043320 | A1* | 2/2014 | Tosaya | G02B 27/0172 345/419 |
| 2014/0093095 | A1* | 4/2014 | Slotte | H04R 1/02 381/87 |
| 2015/0256922 | A1* | 9/2015 | Shi | H04R 1/2842 381/353 |
| 2016/0135314 | A1* | 5/2016 | Ma | G06F 3/041 428/177 |
| 2016/0349808 | A1* | 12/2016 | Daly | G06F 1/20 |
| 2017/0153397 | A1* | 6/2017 | deJong | G02B 6/3826 |
| 2018/0196265 | A1* | 7/2018 | Bouchier | G02B 27/0172 |

FOREIGN PATENT DOCUMENTS

JP 2010155604 A * 7/2010 ............... F15D 1/10

* cited by examiner

*Primary Examiner* — Charles N Appiah
*Assistant Examiner* — Xiang Zhang
(74) *Attorney, Agent, or Firm* — Birch, Stewart, Kolasch & Birch, LLP

(57) ABSTRACT

A mobile terminal including a display panel; a front window provided on a front surface of the display panel; and a plurality of micro-holes in the front window arranged in an array pattern and spaced a preset distance apart from an outer edge area of the front window.

19 Claims, 15 Drawing Sheets (a)

(b)

(c)

MOBILE TERMINAL

CROSS-REFERENCE TO RELATED APPLICATIONS

This application claims priority to Korean Patent Application No. 10-2018-0044051 filed in Republic of Korea on Apr. 16, 2018, the entire contents of which are hereby incorporated by reference in their entirety.

BACKGROUND OF THE DISCLOSURE

Field of the Disclosure

Embodiments of the present disclosure relate to a mobile terminal including a window.

Background of the Disclosure

A display panel is provided to output an image or receive an external touch input. Such a display panel includes a plurality of multi-layered panels. In addition, the display panel is classified into a liquid crystal display (LCD) and an organic light emitting diode (OLED) based on image output manner. An LCD panel has a glass layer disposed in an outer area, and an OLED panel, especially, a POLED panel has no auxiliary glass layer.

However, the above-noted display panels are vulnerable to external shocks when provided in a mobile terminal. In more detail, the LCD panel does not have a sufficient strength and thus is often broken by an external shock. The OLED panel also has dead pixels which are caused by the external shock.

Further, a front window is provided on a front surface of the display panel to protect the display panel. To provide a sufficient strength, the front window may include a glass or ceramic material. Even with the front window, a related art mobile terminal might be breakable by the external shocks. Especially, because of the shape characteristics of the mobile terminal, the corners of the mobile terminal are more likely to be breakable by the external shocks such that there might be a crack from an edge area of the front window. Such a crack will be expanded even to an output area of the display panel enough to ruin visibility.

SUMMARY OF THE DISCLOSURE

Accordingly, an object of the present invention is to address the above-noted and other problems and provide a mobile terminal which also solves the problem of the ruined visibility for the output area caused by the propagated crack on the window.

Embodiments of the present disclosure provide a mobile terminal including a display panel; a front window provided on a front surface of the display panel; and a plurality of micro-holes formed in a first area of the front window. Further, the first area is spaced a preset distance apart from an outer edge area of the front window, and the plurality of the micro-holes are aligned in an array pattern.

According to the embodiment of the present disclosure, the mobile terminal has following advantages. The mobile terminal is capable of minimizing the possibility that a crack is propagated to the inner area of the front window. Furthermore, the mobile terminal may have the front window of which the strength is not weakened even when the micro-holes are provided. Still further, the mobile terminal is capable of securing the water-proof function sufficiently, even when having the micro-holes.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
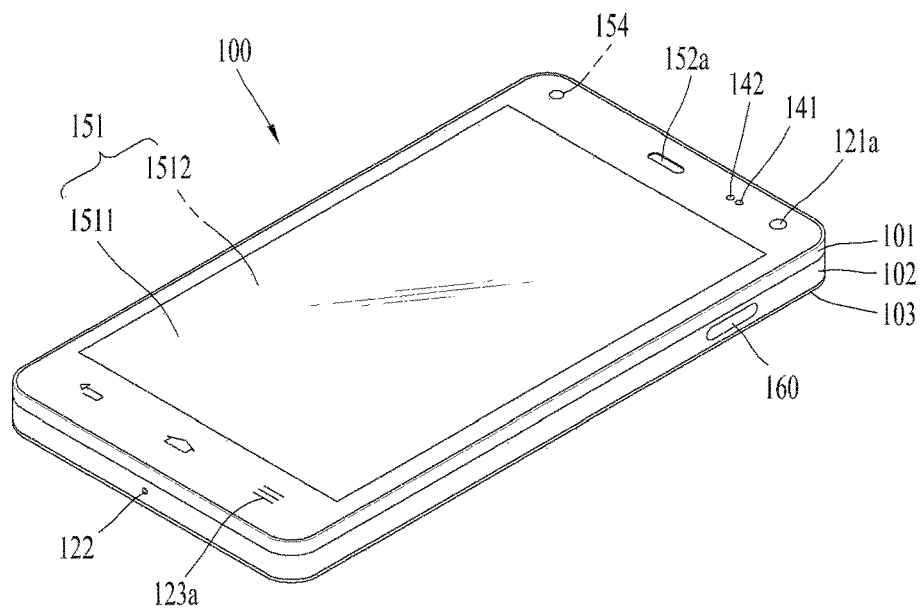
FIGS. 1A and 1B are conceptual views of one example of a mobile terminal in accordance with the present disclosure, viewed from different directions.
Figure 1B:
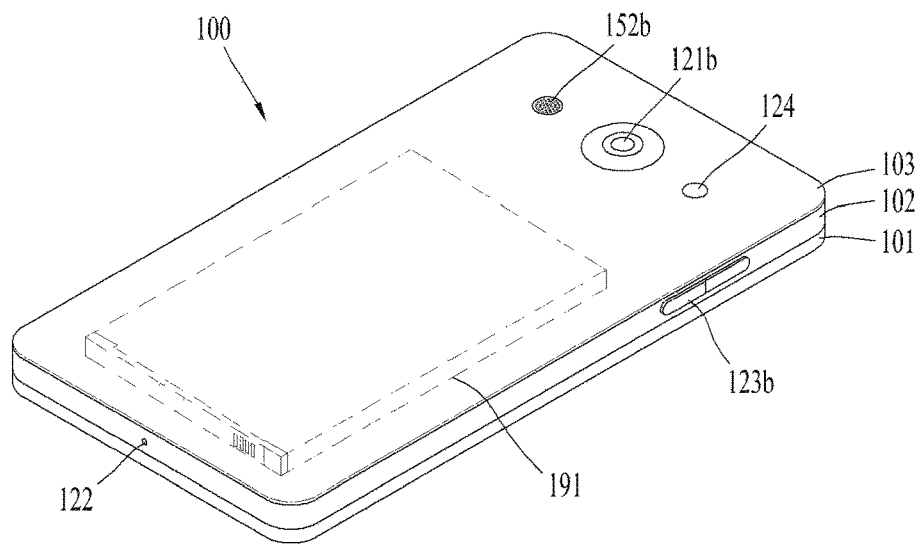

Referring now to FIGS. 1A and 1B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1A and 1B depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123. Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1A illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1B, a flash 124 is shown adjacent to the second camera 121b. When an image of a subject is captured with the camera 121b, the flash 124 may illuminate the subject.

As shown in FIG. 1A, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, it is able to display information processed by the mobile terminal using a flexible display. This is described in detail with reference to the accompanying drawings as follows.

Figure 2:
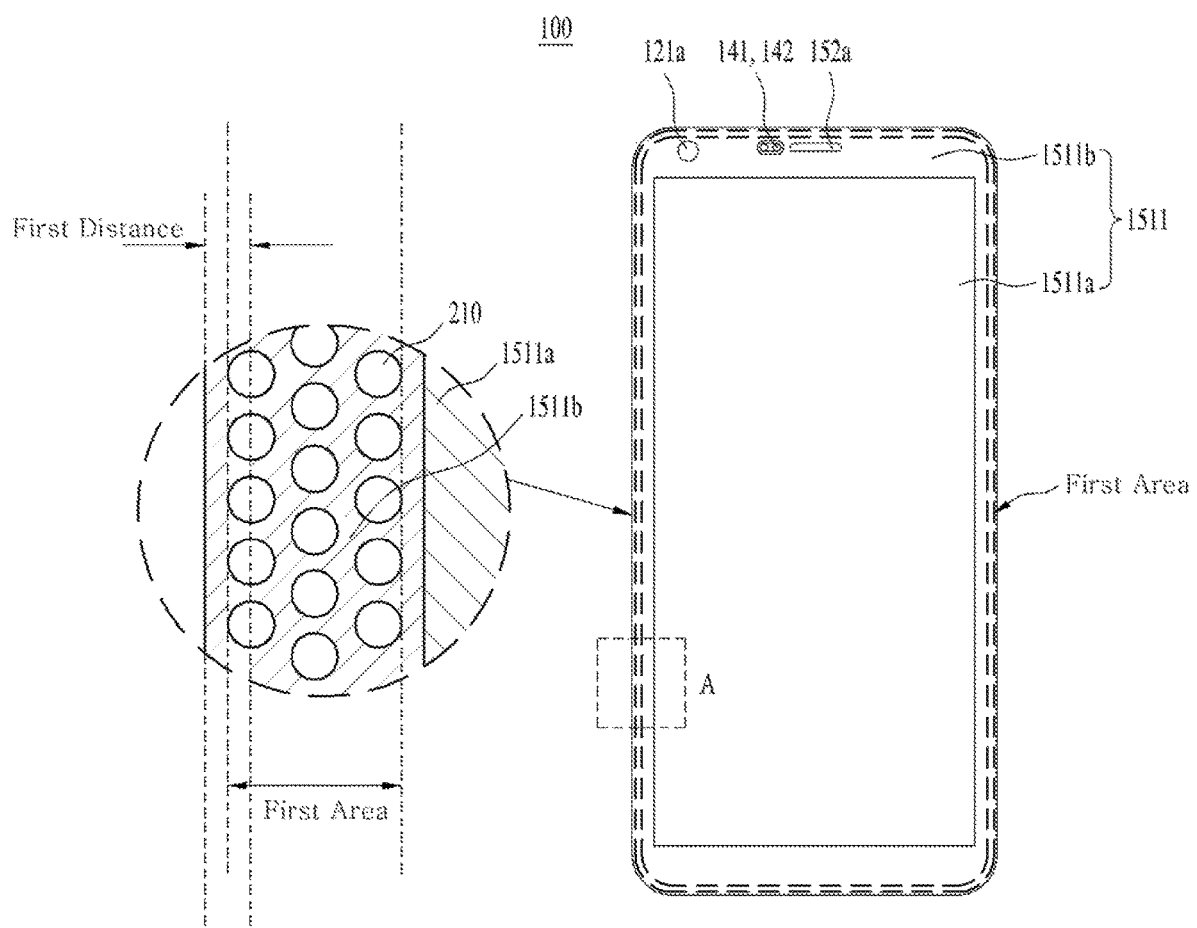
FIG. 2 is a diagram schematically illustrating the mobile terminal.

FIG. 2 is a diagram schematically illustrating the mobile terminal 100. As shown, the mobile terminal 100 includes a plurality of micro-holes 210 configured to prevent a crack generated near an outer edge area of the front window 1511 from being expanded to an inner area of the front window 1511. The embodiments of the present disclosure are described based on the front window 1511 provided in the mobile terminal 100 and they are applicable even to a rear window of the mobile terminal 100 within the modified range, not limited thereto.

In addition, the front window 1511 applied to the embodiments of the mobile terminal 100 may be made of glass. In this instance, the glass may be provided in a uni-layer or multi-layered structure. The front window 1511 may also be provided in a multi-layered structure configured of glass and plastic and may include TCM. More specifically, the present disclosure can be applied to the front window 1511 (e.g., PG2540, GP3021, PP2550 or the like).

Specific characteristics of the embodiments are applicable when the front window 1511 has an elasticity modulus of 80 Gpa and a thickness of 0.5 mm. The plurality of the micro-holes 210 can be provided in a first area near an outer edge area of the front window 1511 and arranged along an entire peripheral area of the outer edge of the front window 1511 as shown in FIG. 2. In this instance, the plurality of the micro-holes 210 provided along the entire peripheral area of the front window 1511 function to minimize the possibilities of the shock or crack generated at one point of the outer edge area from being propagated toward an inner area of the front window 1511.

Alternatively, the plurality of the micro-holes 210 can be arranged along a predetermined peripheral area of the front window 1511. That is, it is difficult to secure a sufficient area for the plurality of the micro-holes 210 in the front upper or lower areas of the mobile terminal 100 in which the camera 121a, a receiver 152a and a home button are provided.

The plurality of the micro-holes 210 can also be spaced a preset distance apart from the outer edge of the front window 1511. If the plurality of the micro-holes 210 are provided too close to the outer edge, the strength and rigidity of the outer edge area might deteriorate enough to damage the front window 1511. More specifically, when the micro-holes 210 are arranged in a circular-shape, a distance from the edge of the front window to the nearest one of the holes is defined as a first distance. Preferably, the first distance is one and a half times or more than a radius of a corresponding micro-hole 210. This was identified from experiments that the strength of the front window 1511 drastically decreased by a fifth when the first distance is one and a half less than the radius.

In addition, the micro-hole 210 may be provided as a micro-small hole which is too small to be visible with the naked eye. Especially, when such a micro-hole is circular, a diameter of the micro-hole 210 may be from 0.005 mm to 0.02 mm. Hereinafter, it is presumed the micro-hole is circular, unless specifically noted. Further, a corresponding area to an output area of the display panel is defined as a transparent area 1511a and the other outer area of the front window 1511 is defined as a bezel 1511b.

The micro-hole satisfying the radius condition is invisible to the naked eye such that it cannot be seen as it is. In this instance, when provided in the transparent area 1511a, the micro-hole 210 is likely to interfere with the travelling of light such that the user could see a distorted image output from the output area. Alternatively, the micro-holes provided in the bezel area 115111b prevent a crack generated in the outer edge of the front window 1511 from being expanded even to the transparent area 1511a.

Figure 3:
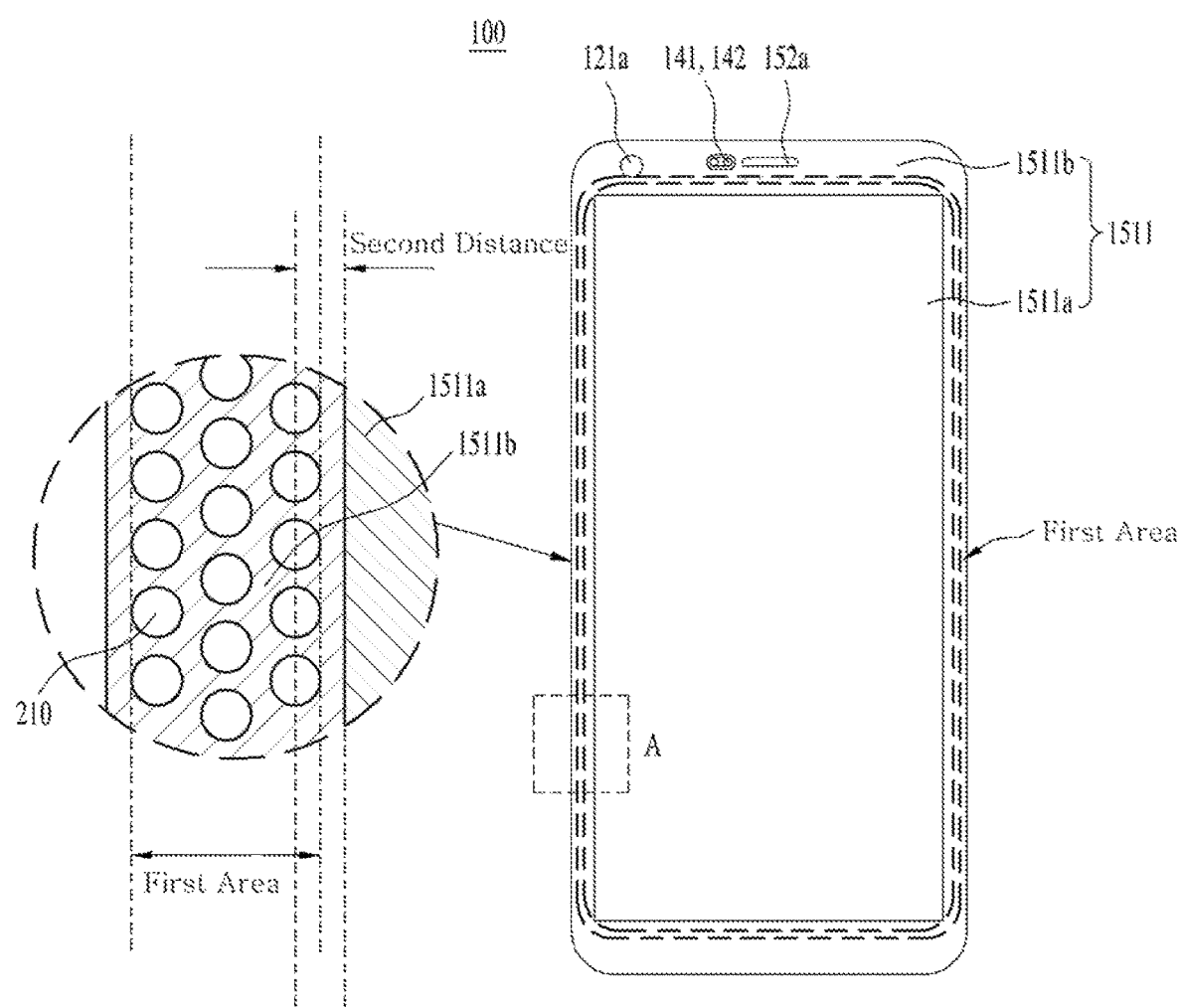
FIG. 3 is a diagram illustrating a front of another example of the mobile terminal.

Next, FIG. 3 is a diagram illustrating a front of another example of the mobile terminal 100. Different from the embodiment of FIG. 2, the plurality of the micro-holes 210 are spaced outwardly a second distance far from an end of the transparent area 1151a provided in the front window 1511. Preferably, the second distance from a center of the innermost one of the micro-holes 210 to the transparent area 1511a is 0.0005 mm.

There would be a manufacture tolerance of about 0.00005 mm. As the micro-holes 210 are provided in the bezel 1511b, the function of the micro-holes 210 to prevent the propagation of the crack toward the transparent area 1511a is the same as described in the embodiment of FIG. 2. However, different from the embodiment of FIG. 2, the plurality of the micro-holes 210 are spaced a sufficient distance apart from the outer edge of the front window 1511 so as to secure an additional effect of a sufficient strength for the corner area.

Figure 4:
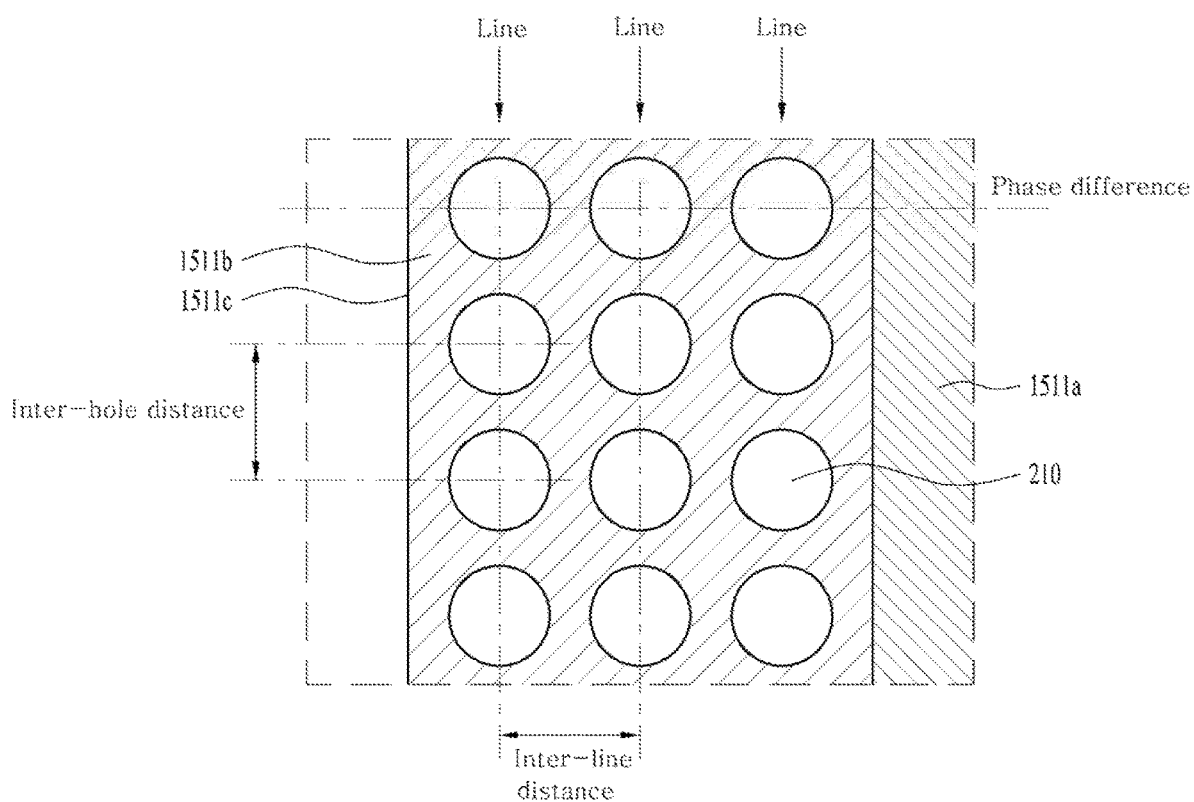
FIG. 4 is an enlarged view of A-A shown in FIG. 2.

Next, FIG. 4 is an enlarged view of A-A shown in FIG. 2. As shown, the plurality of the micro-holes 210 can be provided in an array pattern. The array pattern means an arrangement characteristic having regular alignment. In other words, the micro-holes 210 can be repeatedly aligned in a preset regular pattern and specific examples of the array pattern will be described later.

When the micro-holes 210 form one or more lines, the micro-holes 210 provided in one line can be aligned at the same intervals. A distance between centers of the micro-holes aligned in one specific line may be from one and a half times to five times of the sum of the radii of the micro-holes 210. The results of the experiments indicate that the reduction ratio of the cracks propagated to the transparent area decreases by 25% less, when the intervals between the micro-holes 210 become wider than the range mentioned above, and that the strength of the front window decreases by a fifth when the intervals becomes narrower than the range.

Preferably, the intervals between the micro-holes are from one and a half times to three times of the sum of the radii. In this instance, the reduction ratio of the crack propagated to the transparent area is 50% or more. Alternatively, the plurality of the micro-holes 210 can be aligned in several lines. For example, the lines can be in parallel with the nearest edge 1511c. When a crack occurs in the nearest edge, the micro-holes 210 can be overlapped with each other in several lines so as to minimize the possibility that the crack caused in the edge 1511c of the front window 1511 can be propagated to the transparent area 1511a.

More lines minimize the possibility of the crack propagation to the transparent area 1511a. However, as more micro-holes 210 are provided, the strength of the front window 1511 is lowered such that it is preferable the number of the lines is properly determined. It is also preferable the micro-holes 210 are aligned in three lines parallel with the edge 1511c.

In addition, the lines can be spaced a predetermined distance apart from each other. Also, the distance between the lines corresponding to a distance between the centers of the micro-holes 210 can be one and a half times or more and five times or less of the sums of the radii of the micro-holes 210. In this instance, the radius of the micro-hole 210 means the radius of two neighboring micro-holes 210.

The results of the experiments indicate that the reduction ratio of the crack propagation to the transparent area 1511a decreases by 25% or less, when the distance between the micro-holes 210 becomes wider than the range mentioned above, and that the strength of the front window 1511 decreases by a fifth, when the distance between the micro-holes 210 becomes narrower than the range. Especially, the distance between the lines can be from one and a half times to three times of the sum of the radii. In this instance, the results of the experiments indicate that the reduction ratio of the crack propagation to the transparent area 1511a is 50% or more. In addition, the lines can be provided with no phase difference. In other words, the neighboring micro-holes aligned in each line can be collinear in a vertical direction with respect to the edge 1511c of the front window 1511.

Figure 5:
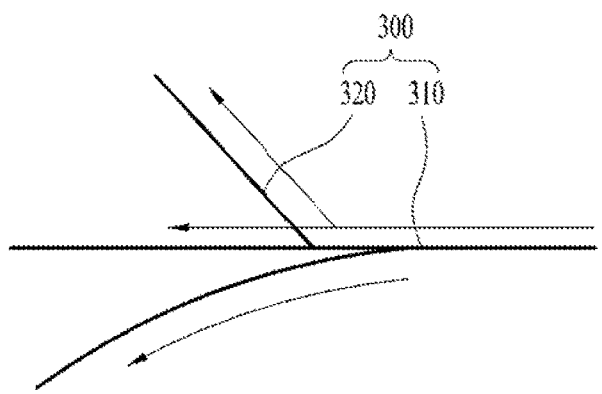
FIG. 5 is a diagram illustrating a crack area of a front window.
Figure 5:
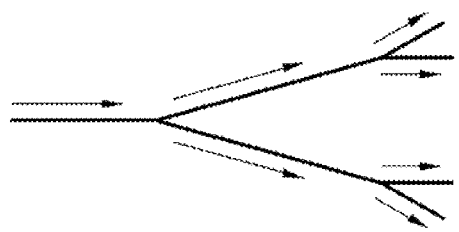
Figure 5:
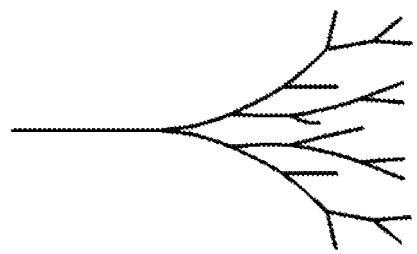

Next, FIG. 5 illustrates the types of the cracks generated in the front window. In more detail, a crack 300 generated in the front window has a tendency shown in FIG. 5(a). As shown, the crack 300 includes a first crack 310 which tends to go straight along a propagation direction of the first crack point, and a second crack 320 which tends to obliquely go from a certain point of the first crack 310. Viewed from the entire area of the crack 300, the crack tends to continuously propagate along the propagation direction of the first crack 310 which is the original crack and then gradually become wider. That is the entire or overall tendency, not necessarily showing the individual tendency of each crack.

FIG. 5(b) shows when a relatively low stress is applied, and FIG. 5(c) shows when a relatively high stress is applied. As the stress is stronger, more second cracks 320 are created. Accordingly, to minimize the propagation of the crack 300, the generation and propagation pattern of the crack 300 is considered. As one example, the propagation of the first crack 310 is preferably blocked before the second crack 320 is propagated.

Figure 6:
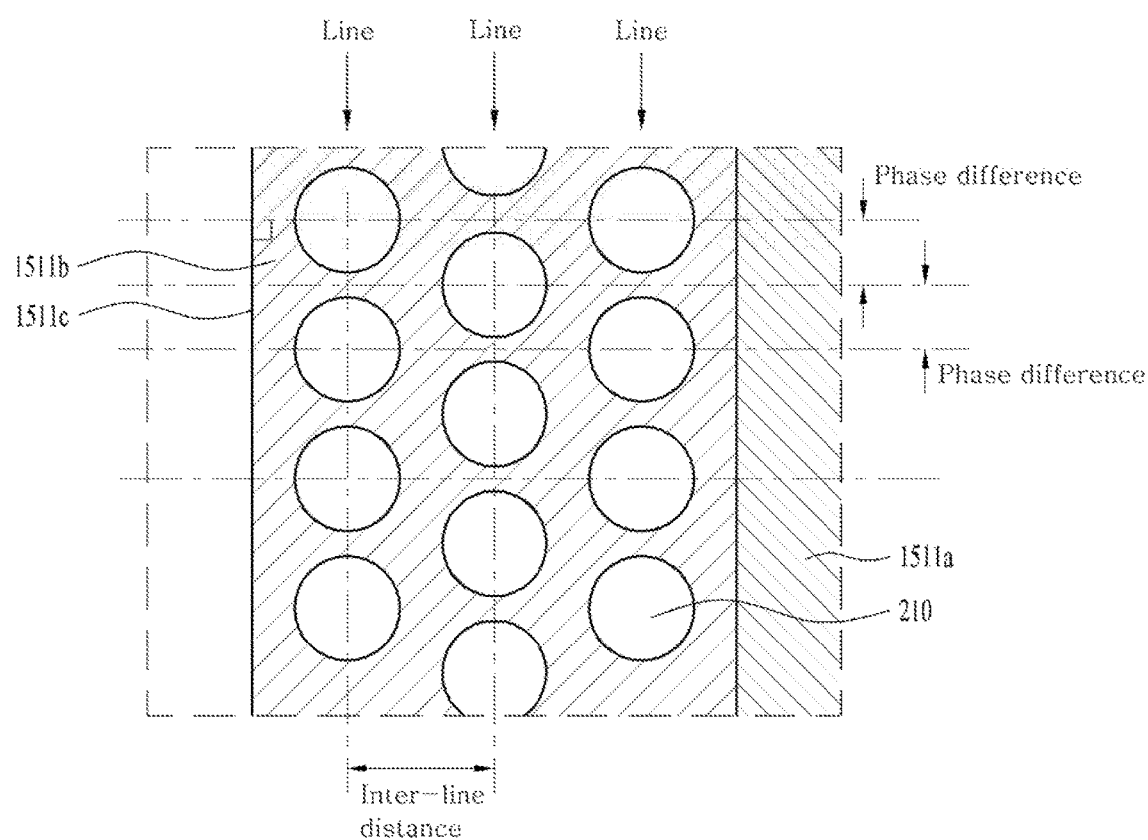
FIG. 6 is an enlarged view of a predetermined area of the front window.

Next, FIG. 6 is an enlarged view of a predetermined area of the front window. Different from the embodiment of FIG. 4, the embodiment of FIG. 6 shows that the plurality of the micro-holes 210 are arranged in a lattice pattern in consideration of the straight propagation quality of the crack. In other words, neighboring ones of the lines can have a preset phase difference. Hence, the crack having passed between the micro-holes 210 in a specific line is more likely to meet other micro-holes 210 in the next line.

Figure 7:
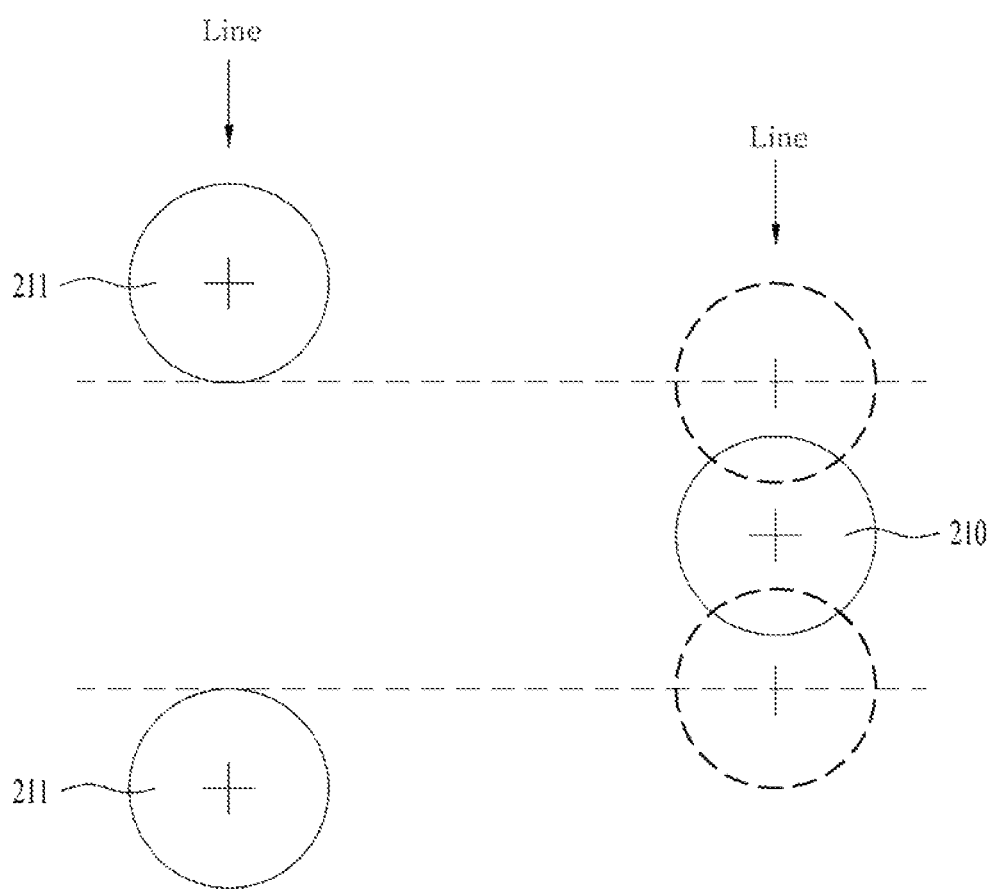
FIG. 7 is a diagram illustrating a plurality of micro-holes.
Figure 8:
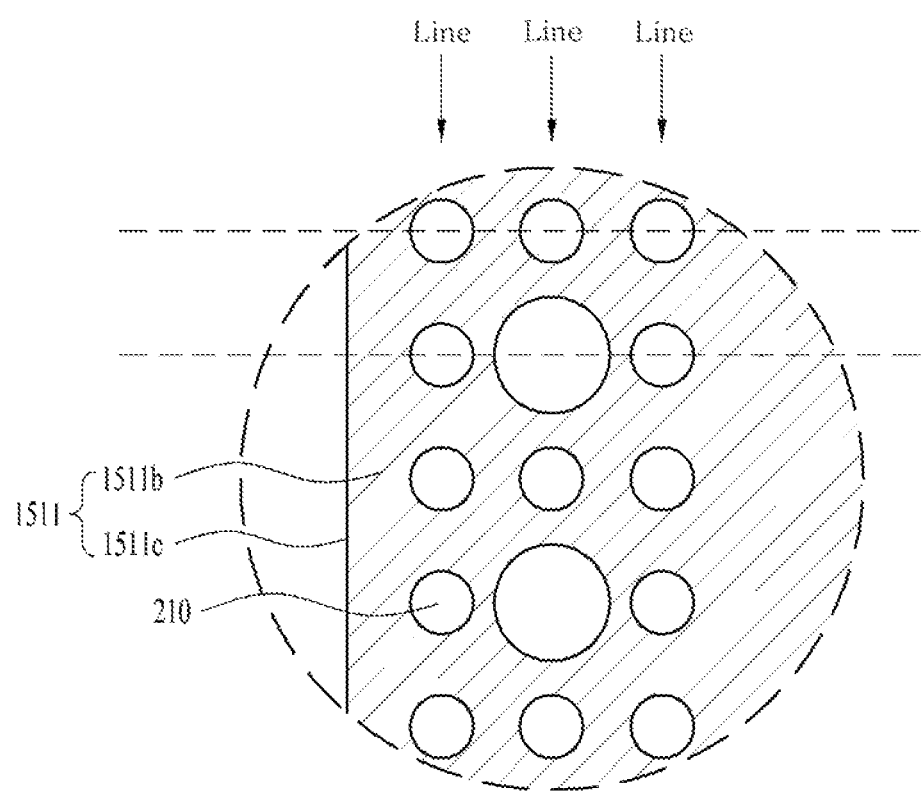
FIGS. 8 through 14 are diagrams illustrating several examples of a arrange pattern provided in the plurality of the micro-holes.
Figure 9:
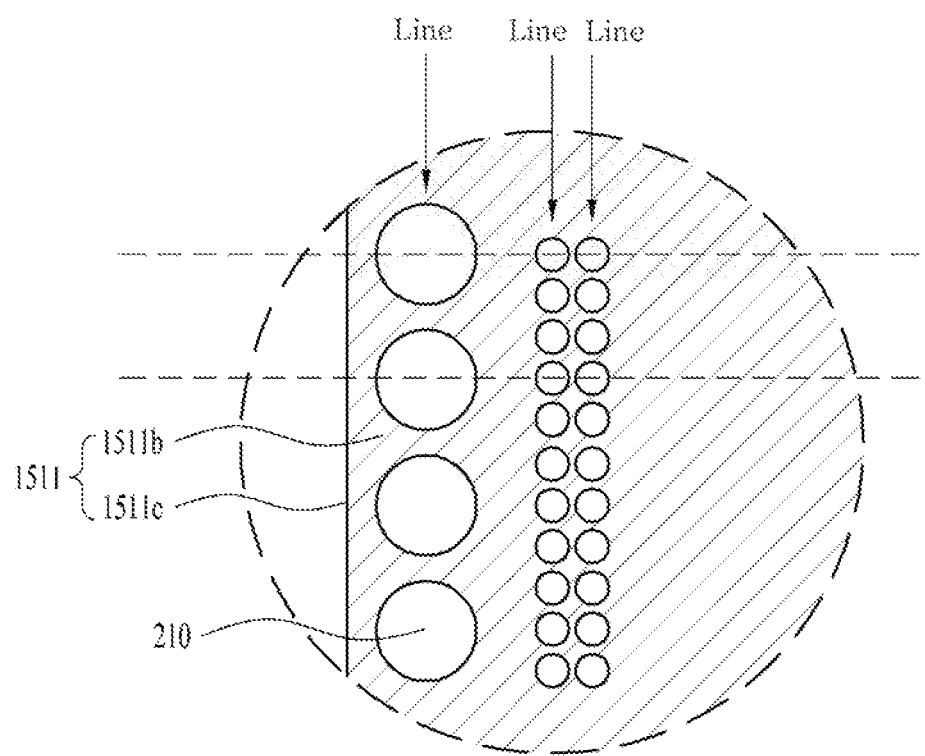
Figure 10:
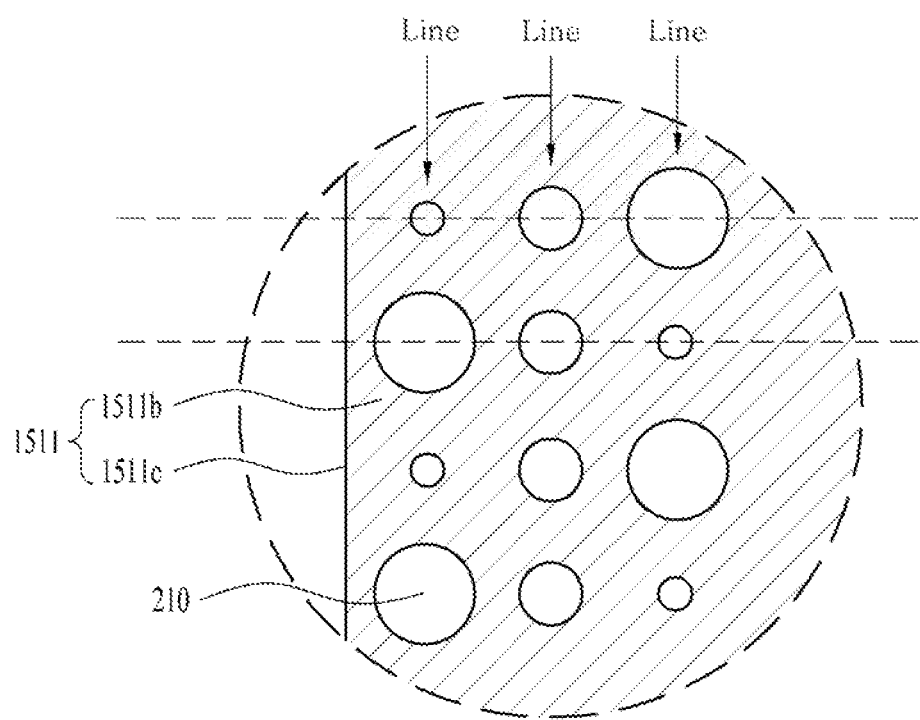

FIG. 7 is a diagram illustrating a plurality of micro-holes 210. As shown, the center of one specific micro-hole 210 arranged in one specific line can be arranged between tangent lines of two neighboring micro-holes provided in neighboring two lines. More preferably, the center is located in the middle of the tangent lines of the two neighboring micro-holes 211.

Next, FIGS. 8 through 14 are diagrams illustrating several examples of arranged patters provided in the plurality of the micro-holes 210. The examples include micro-holes having the same and different sizes.

Figure 11:
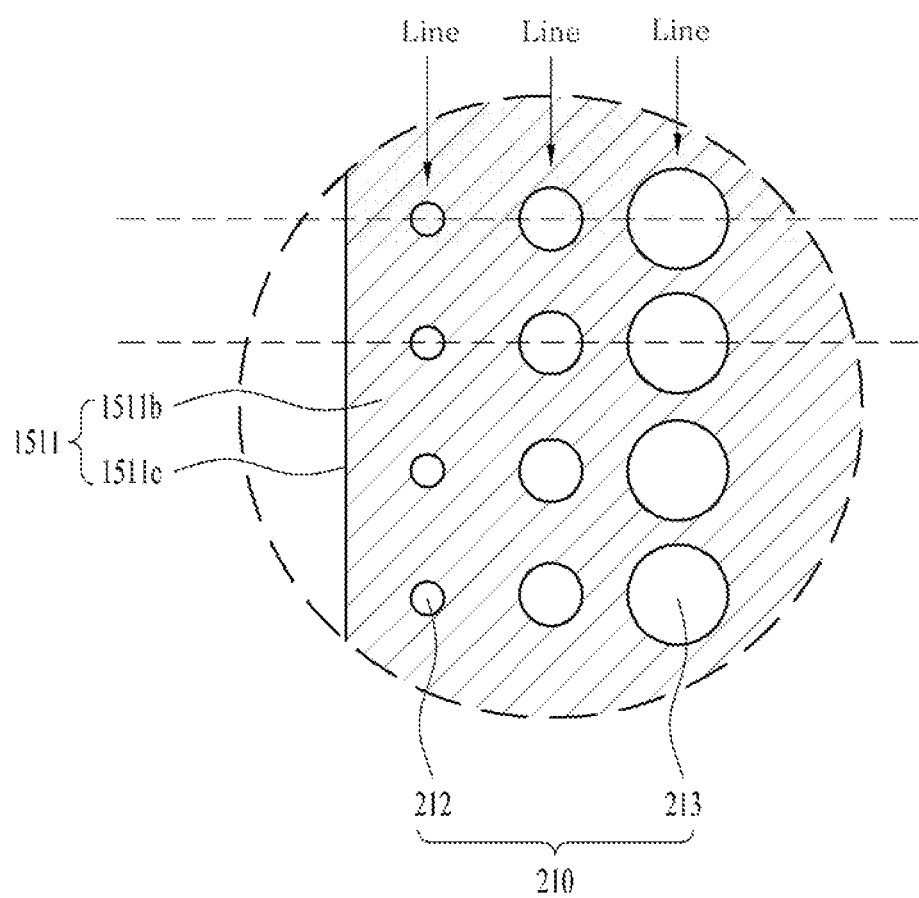
Figure 12:
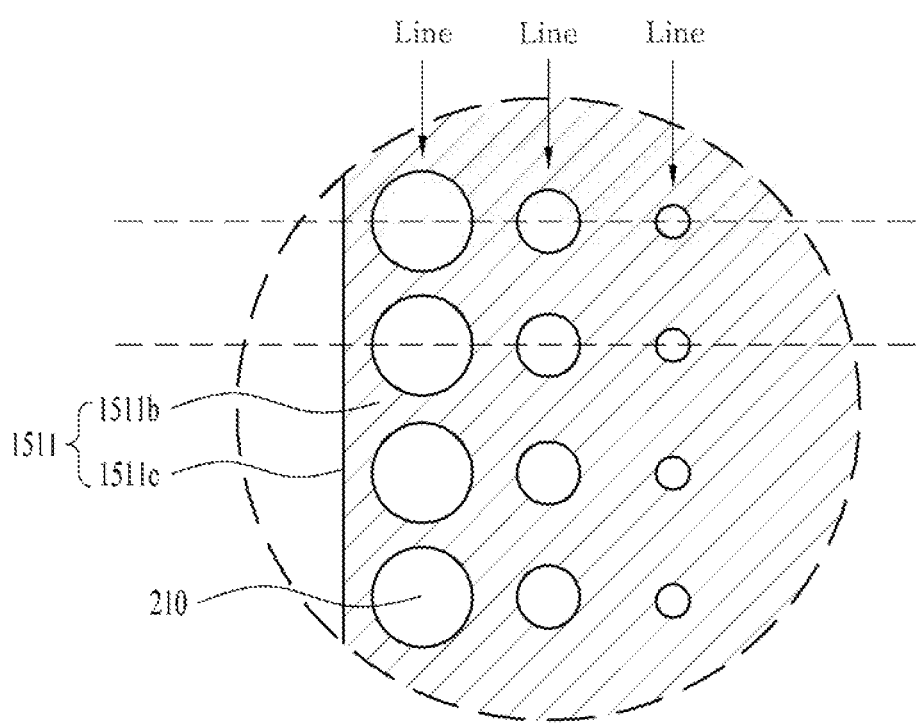

In more detail, FIGS. 8 through 12 illustrate a plurality of lines having no phase difference, like FIG. 4. The different technical feature is that the micro-holes 210 having different radii are arranged to minimize the strength deterioration of the front window and the reduction ratio of the crack propagation to the transparent area simultaneously. FIG. 11 also shows that radii of the micro-holes 212 arranged in the line near the edge 1511c of the front window 1511 are relatively small so as to enhance the strength of the outer area of the front window 1511 and that radii of the micro-holes 213 arranged in the lines closer to the inner area become gradually larger so as to enhance the reduction ratio of the crack propagation.

Figure 13:
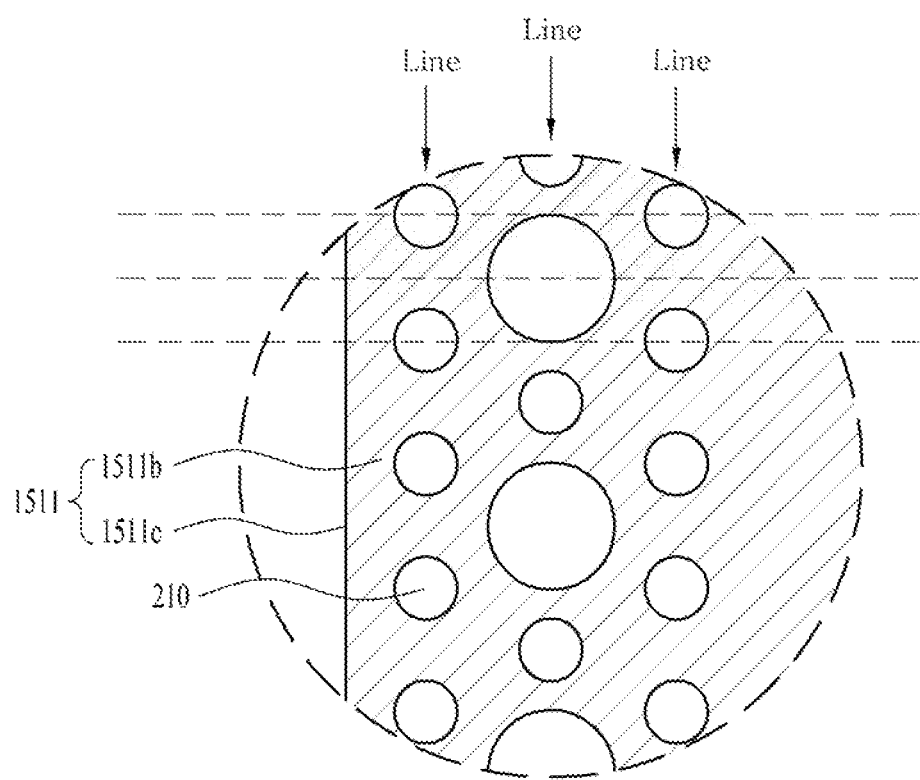
Figure 14:
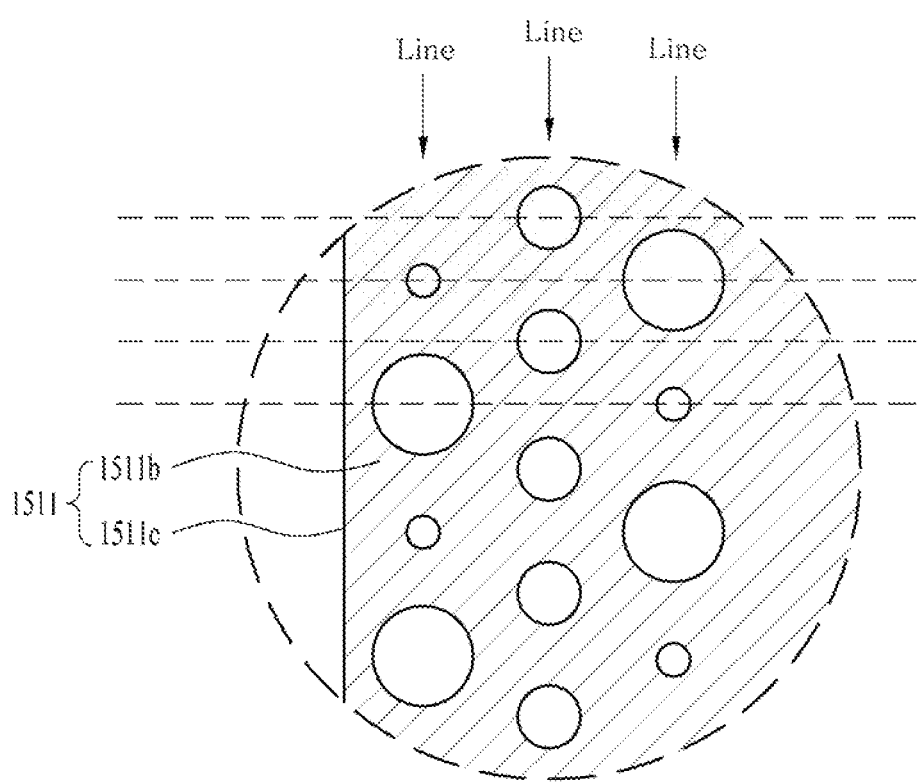
Figure 15:
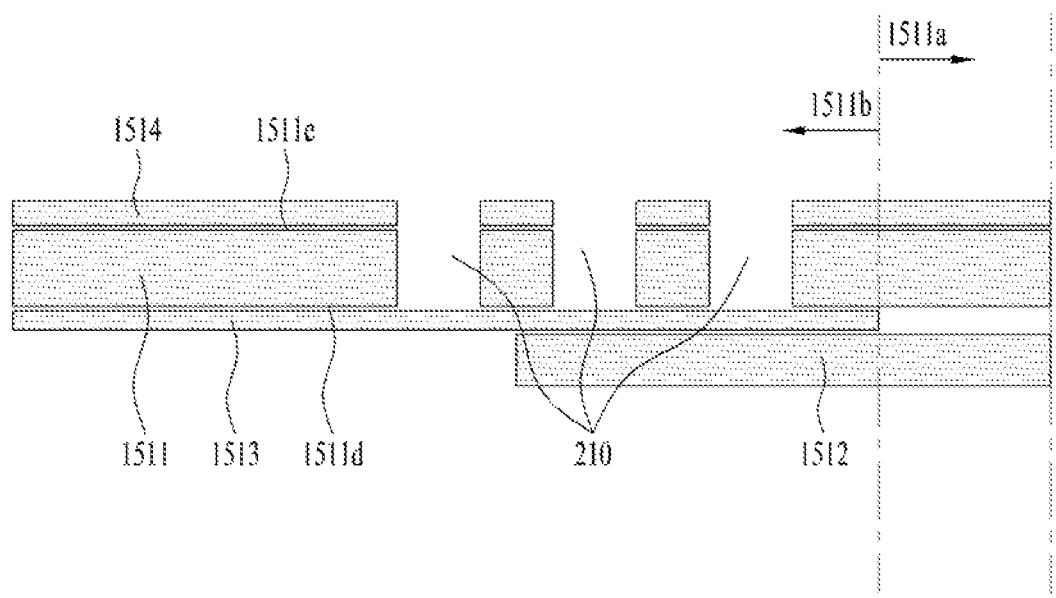
FIG. 15 is a conceptual diagram illustrating one cross sectional area of the front window.

FIGS. 13 and 14 illustrate examples of the lines having a phase difference. Similarly, the micro-holes having a different radius are alternatively arranged to combine the increase of the strength and the decrease of the reduction ratio of the rack propagation properly. FIG. 15 is a conceptual diagram illustrating one cross sectional area of the front window 1511. A print layer 1513 is disposed on a rear surface 1511d of the front window 1511 and configured to prevent the other unnecessary area from becoming visible outside, except the output area of the display panel 1512, as the front window is formed of an optical transparent material.

When the area of the front window 1511 is divided into the transparent arear 1511a and the bezel 1511b as mentioned above, the plurality of the micro-holes 210 can be provided in the bezel 1511b having the print layer 1513. In addition, the micro-holes 210 provided in the print area 1513 minimize the possibility of the liquid flow via the micro-holes 210, because the print layer 1513 disposed on the rear surface 1511d of the front window 1511.

Further, a finger-print-proof coating layer 1514 can be provided on a front surface 1511e of the front window 1511. Considering the material characteristics of the finger-print-proof coating layer 1514, a contact angle becomes larger in the front window 1511 than the front window having no finger-print-proof coating layer 1514 and then a capillary phenomenon occurs so as to minimize the possibility of liquid flow to the inner area of the rear surface of the front window 1511.

The plurality of the micro-holes can also be formed by laser or etching. When the micro-holes are formed by laser, minute cracks might occur near the micro-holes and then additional cracks are more likely to occur. The etching process eliminates such minute cracks near the micro-holes and includes a process that the laser-processed front window is submerged in a hydrofluoric acid or alkali solution.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a display panel;
a front window provided on a front surface of the display panel; and
a plurality of micro-holes provided in the front window, the plurality of micro-holes being arranged in an array pattern,
wherein the front window includes:
a transparent area corresponding to an output area of the display panel;
a bezel provided in an outer area of the transparent area;
an audio output area provided in the bezel, the audio output area allowing audio generated by the mobile terminal to pass there through; and
a print layer provided on a rear surface of the bezel, the print layer being configured to make the bezel opaque,
wherein the plurality of micro-holes are located within a first area of the front window and are configured to prevent a crack generated near an outer edge area of the front window from being expanded to an inner area of the front window,
wherein the first area extends along an entire outer edge of the front window bypassing the audio output area and is flush with the audio output area within the front window, and
wherein the print layer is configured to close the plurality of micro-holes.

2. The mobile terminal of claim 1, wherein the plurality of the micro-holes are arranged in parallel lines to a neighboring edge of the front window.

3. The mobile terminal of claim 2, wherein the plurality of the micro-holes are circular-shaped, and
wherein a distance between a center of a corresponding micro-hole arranged in a nearest line to the neighboring edge of the front window and the neighboring edge is one and a half times a radius of the corresponding micro-hole arranged in the nearest line.

4. The mobile terminal of claim 2, wherein the micro-holes are arranged in each line at equidistant intervals.

5. The mobile terminal of claim 4, wherein the micro-holes are circular-shaped, and wherein a distance between centers of neighboring micro-holes arranged in each line is one and a half times or more and three times or less than a sum of a radii of the neighboring micro-holes.

6. The mobile terminal of claim 2, wherein the plurality of the micro-holes are arranged in a lattice pattern.

7. The mobile terminal of claim 2, wherein the micro-holes are circular-shaped, and wherein a distance between the lines is one and a half or more and three times or less than a sum of a radii of neighboring micro-holes arranged in the line.

8. The mobile terminal of claim 1, wherein the first area is located in the bezel and entirely encloses the transparent area, and wherein the first area passes between the audio output area and an outer edge of the transparent area.

9. The mobile terminal of claim 1, wherein the front window further includes: a finger-print-proof coating layer provided on a front surface of the bezel, the finger-print-proof coating layer including a plurality of through-holes communicating with the plurality of micro-holes.

10. The mobile terminal of claim 1, wherein the micro-holes comprise lasered-micro-holes or etched-micro-holes.

11. The mobile terminal of claim 1, wherein the micro-holes are circular-shaped.

12. The mobile terminal of claim 1, wherein the micro-holes have a size of 0.0005 mm or more and 0.02 mm or less.

13. The mobile terminal of claim 1, wherein the micro-holes are arranged in parallel longitudinal lines along a longitudinal edge of the mobile terminal.

14. The mobile terminal of claim 13, wherein a number of the longitudinal lines of the micro-holes is 3 more.

15. The mobile terminal of claim 13, wherein centers of micro-holes arranged in a first line closest to the longitudinal edge of the mobile terminal are aligned with centers of micro-holes arranged in a second line adjacent to the first line.

16. The mobile terminal of claim 13, wherein centers of micro-holes arranged in a first line closest to the longitudinal edge of the mobile terminal are offset with centers of micro-holes arranged in a second line adjacent to the first line.

17. The mobile terminal of claim 16, wherein the centers of the micro-holes arranged in the second line are aligned with a middle position between adjacent micro-cells to block a crack passing through the middle position.

18. The mobile terminal of claim 16, wherein the centers of the micro-holes arranged in the second line are aligned with tangent lines of the micro-holes arranged in the first line.

19. The mobile terminal of claim 13, wherein the micro-holes arranged in a first line closest to the longitudinal edge of the mobile terminal have a smaller radius than micro-holes arranged in a second line adjacent to the first line.

* * * * *